INVENTOR.
Jacob S. Kamborian
BY Albert Gordon ATT'Y

Dec. 7, 1965   J. S. KAMBORIAN   3,221,937
CEMENT EXTRUDING MECHANISM
Filed June 3, 1963   2 Sheets-Sheet 2
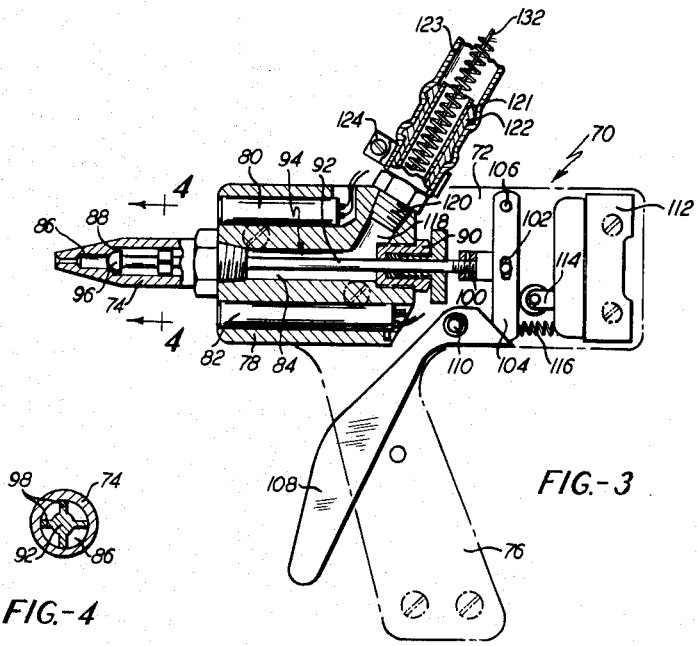
FIG.-3
FIG.-4
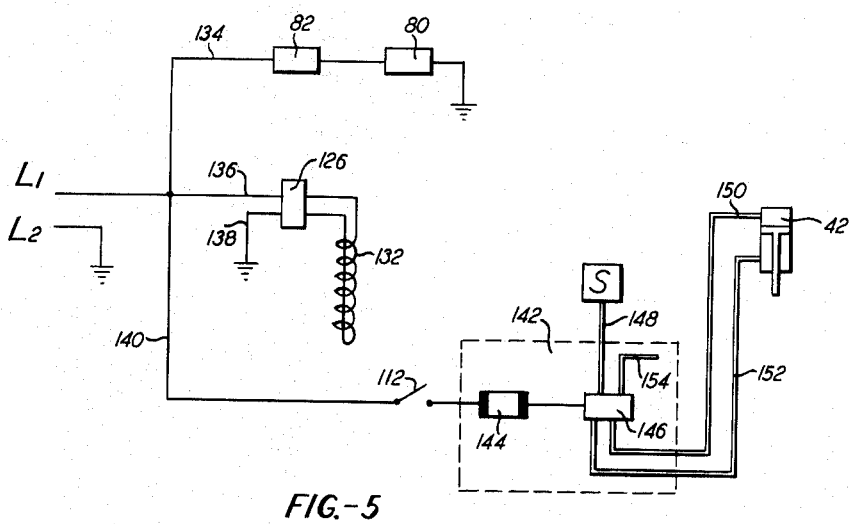
FIG.-5

United States Patent Office 3,221,937
Patented Dec. 7, 1965

3,221,937
CEMENT EXTRUDING MECHANISM
Jacob S. Kamborian, 133 Forest Ave.,
West Newton, Mass.
Filed June 3, 1963, Ser. No. 285,446
6 Claims. (Cl. 222—76)

This invention relates to a mechanism for extruding molten thermoplastic cement onto at least one of a pair of work parts that are to be bonded to each other. The mechanism includes a cement pot connected to a cement extruding gun by means of a conduit. The gun includes a barrel or nozzle having an orifice through which cement may be extruded in response to the actuating of pressure applying means mounted on the pot and a valve that normally blocks the orifice. A trigger mounted on the gun is operably connected to the valve and to the pressure applying means so that a pressing of the trigger concomitantly moves the valve to an unblocking position and actuates the pressure applying means to force cement through the barrel and a releasing of the trigger concomitantly moves the valve to its blocking position and terminates the application of pressure by the pressure applying means.

Figure 1:
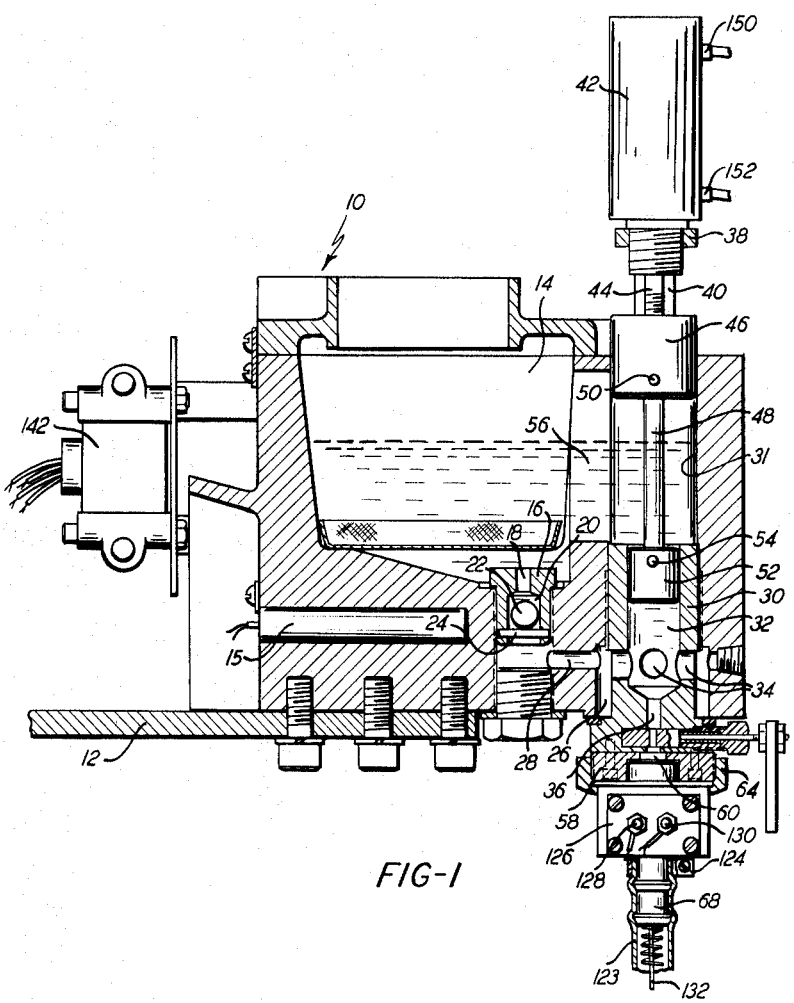
Figure 2:
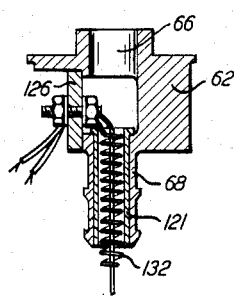

In the accompanying drawings:
FIG. 1 is vertical section of the cement pot;
FIG. 2 is a detail of the connection between the cement pot and the conduit;
FIG. 3 is a view of the gun;
FIG. 4 is a section to an enlarged scale taken on the line 4—4 of FIG. 3; and
FIG. 5 is a circuit diagram of the control for the mechanism.

Referring to FIG. 1, the mechanism includes a cement pot 10 mounted on a fixed base 12. The pot is made of a heat conductive material such as aluminum and includes a well 14 in which thermoplastic cement may be deposited. Heating means, that include an electric cartridge heater 15 embedded in the pot, are provided to heat the pot. A ferrule 16 is threaded into a hole in the bottom of the well. The ferrule has a centrally located small diameter passage 18 that opens into a large diameter passage 20. A ball 22, resting on a pin 24 extending across the passage 20, is cooperative with the passage 18 to act as a valve in the manner described below. The passage 20 opens into a chamber 26 by way of a port 28. A sleeve 30, threaded into a guide hole 31 above the chamber 26, has an axial bore 32 that intersects a plurality of radial ports 34 that extend from the bore 32 to the chamber 26. The bore 32 is connected to the bottom of the sleeve 30 by a bore 36. A plate 38 is supported above the pot 10 by a pair of spacer sleeves 40, only one of which is shown in FIG. 1. An air operated double acting motor 42 is threaded into the plate 38 and has a piston rod 44 depending therefrom. A stem 46 is secured to the lower end of the piston rod 44 and is slidable in the guide hole 31. A rod 48 is connected at its upper end to the stem 46 by a pivot pin 50. A plunger 52, that is slidable in the bore 32, is connected to the lower end of the rod 48 by a pivot pin 54. A cut-out 56 provides communication between the well 14 and the guide hole 31. A base 58 is fitted to the bottom of the sleeve 30 and has a hole 60 that is in communication with the bore 36. A bracket 62 (see FIG. 2) is fitted to the bottom of the base 58 by a threaded cap 64. The bracket 62 has a hole 66 extending therethrough that is in communication with the hole 60 and has a hollow prong 68 extending downwardly thereof.

The mechanism also includes a gun 70 (FIG. 3). The gun comprises a breech 72 having a barrel 74 extending forwardly thereof and a butt 76 depending therefrom. A block 78 is located at the forward portion of the breech. An electric cartridge heater 80 is inserted in the block to heat it and is controlled by a thermostat 82 also inserted in the block. The block and barrel have aligned orifices 84 and 86 extending therethrough. The barrel orifice 86 is formed to provide a rearwardly facing ledge 88 that acts as a valve seat. A bushing 90 is threaded into the rearward end of the block 78 and the stem 92 of a valve 94 is slidably mounted in the bushing 90. The valve stem 92 extends forwardly of the bushing 90 into the barrel orifice 86 and terminates in a valve head 96. A plurality of fins 98 extend radially from the valve stem 92 in the barrel hole 86. A clevis 100, secured to the rear end of the valve stem 92, is connected by a pin and slot connection 102 to a link 104 that is fulcrummed to the breech 72 at its upper end by a pivot 106. A trigger 108 is pivoted to the breech 72 by a pivot 110 to extend downwardly and forwardly of the butt 76.

A normally open micro-switch 112 is secured to the rear of the breech 72 with its blade 114 bearing against the link 104. The rearward portion of the trigger 108 and the lower portion of the link 104 form cooperating cam surfaces that are normally yieldably urged to the FIG. 3 position by a compression spring 116 that extends between the microswitch 112 and the link 104.

An orifice 118 extends from the top of the block 78 downwardly to intersect the orifice 84. A hollow nipple 120 threaded into the orifice 118 has a hollow prong 122 extending upwardly thereof. A sleeve 121 of electrically insulative material such as Teflon is fitted within the prongs 68 and 122. A flexible hollow conduit 123 made of a tube that is thermally and electrically insulative such as silicone has its ends embracing the prongs 68 and 122 and is secured to the prongs by hose clamps 124. A terminal block 126 secured to the bracket 62 (FIGS. 1 and 2) has a pair of terminal studs 128 and 130 thereon. A resistor wire 132 extends from the terminal stud 128 axially through the conduit 123 to the portion of the conduit within the prong 122 and then doubles back in spiral convolutions about the axial portion to the terminal stud 130. The axial portion of the wire 132 preferably has electrically insulative material thereon.

Referring to FIG. 5, the control circuit for the machine includes a source of electrical power labelled L1, L2 that is connected to the heater 80 and thermostat 82 in the gun 70 by a line 134. The terminals 128 and 130 are respectively connected to the source of power by way of lines 136 and 138. The normally open microswitch 112 is connected to the source of power by a line 140 and is in series with a solenoid valve unit 142 that is mounted on the cement pot 10 (FIG. 1). The unit 142 includes a solenoid 144 and a four way valve 146. The valve 146 is connected to a source of air under pressure labelled S by way of a line 148 and is respectively connected to the upper and lower ends of the motor 42 by lines 150 and 152. An exhaust port 154 connects the valve 146 to atmosphere. With the solenoid 144 in its normally deenergized position the lines 148 and 152 are in communication and the line 150 and the port 154 are in communication so that the motor 42 is in the upper position shown in FIG. 1.

In the operation of the mechanism, thermoplastic cement is deposited in the well 14 of the pot 10 by any means found desirable, as for example by the dispensing mechanism shown in Patent No. 3,011,042. The cement is maintained in a molten condition in the pot 10 by means of the heating means in the pot including the heater 15. At this time the ball 22 is resting on the pin 24 so that the molten cement gravitates into the chamber 26 by way of the passages 18 and 20 and the port 28. From the chamber 26, the molten cement enters and fills the bore 32 by way of the radial ports 34 and fills the conduit 123 by way of the bore 36 and the holes 60 and 66. From the conduit 123, the molten cement passes into the orifices 118, 84, and 86 filling the orifices up to the valve head 96 with the cement passing between the fins 98 to get to the valve head 96. The cement is maintained molten in the conduit 123 by means of the heated resistor wire 132 and is maintained molten in the gun 70 by means of the heater 80. The sleeves 121 prevent shorting of the wire 132 against the prongs 68 and 122, the electrically insulative construction of the conduit prevents shorting of the wire 132 against the conduit and the insulation on the axial section of the wire 132 prevents arcing between the spiral and axial sections of the wire. The molten cement also enters the guide hole 31 by way of the cut-out 56.

The gun is grasped by the operator and placed adjament the work part on which it is desired to place the adhesive and the trigger is pressed to move it counterclockwise (FIG. 3) thereby causing counterclockwise movement of the lever 104 about the pivot 106 by way of the cooperating cam surfaces on the trigger and lever. This causes the valve 94 to be moved rearwardly to displace the valve head 96 from the valve seat 88 and concomitantly closes the microswitch 112 by moving the switch blade 114 rearwardly. The closure of the microswitch energizes the solenoid 144 to thereby actuate the valve 146 to place the air lines 148 and 150 in communication and vent the air line 152 to atmosphere through the port 154. This actuates the motor 42 to move the plunger 52 downwardly to create a pressure which forces the ball 22 upwardly to close the passage 18 and forces cement through the conduit 123 and gun 70 so that the cement is extruded out of the barrel 74, which acts as a nozzle, onto the workpiece. Upon releasing the trigger, the valve 94 is returned to its FIG. 3 position by the spring 116 to block the egress of cement through the barrel 74 and the switch 112 is concomitantly opened to deenergize the solenoid 144 and thus actuate the valve 146 to cause the motor 42 to raise the plunger 52 to its FIG. 1 position and thus terminate the pressure forcing the cement through the conduit 123 and the gun 70. So long as the trigger is released before the plunger 52 has reached its lowest position, cement is continuously extruded from the barrel 74 while the trigger is pressed and the flow of cement from the barrel is terminated as soon as the trigger is released due to the seating of the valve head 96 against the valve seat 88. Between actuations of the trigger 108, the molten cement fills the cement pot parts, the conduit and the gun parts in the manner described above. During the period that the trigger is pressed the operator may manipulate the gun across the work part to be coated with cement so as to provide a ribbon of cement thereon.

During the upward and downward movement of the plunger 52, there is molten cement both above and below the plunger. There is clearance between the plunger 52 and the bore 32 that is sufficiently large to enable a film to be formed between the plunger and bore to provide the advantages described in pending application Ser. No. 168,578 filed Jan. 19, 1962, now Patent No. 3,130,876. The clearance is made sufficiently small as to prevent a substantial pressure loss during the downward working stroke of the plunger.

One example of the applicability of the mechanism is to deposit a ribbon of cement on a shoe insole prior to wiping the lasting margin of a shoe upper against the insole as disclosed in Patent No. 2,969,555.

It should be understood that the present disclosure is for the purpose of illustration only and that the invention includes all modifications and equivalents which fall within the scope of the appended claims.

I claim:

1. A cement extruding mechanism comprising: a cement pot adapted to contain a quantity of cement; a gun; a barrel on the gun; an orifice in the barrel having a valve seat thereon; a conduit interconnecting the cement pot and orifice; pressure applying means operable when actuated to force cement from the cement pot through the conduit into the orifice; a valve in the orifice having a valve head and a valve stem extending away from the valve head, said valve having a first position wherein the head is seated against the seat to block the orifice and a second position wherein the head is away from the seat to permit the flow of cement through the orifice; means mounting the valve for movement from each of said positions to the other of said positions; a link movably mounted in the gun and connected to the valve stem so that movement of the link in a first direction causes movement of the valve from the first position to the second position and movement of the link in a second direction causes movement of the valve from the second position to the first position; a control member mounted in the gun having an actuating member so positioned as to be moved in response to movements of the link in each of said directions; control means interconnecting the control member and the pressure applying means actuable in response to movement of the actuating member by the movement of the link in the first direction to operate the pressure applying means and actuable in response to movement of the actuating member by the movement of the link in the second direction to terminate the operation of the pressure applying means; and a trigger mounted in the gun for effecting said movements of the link.

2. A cement extruding mechanism comprising: a cement pot adapted to contain a quantity of cement; a gun; a barrel on the forward end of the gun; an orifice in the barrel having a valve seat thereon; a conduit interconnecting the cement pot and orifice; a plunger in the cement pot mounted for reciprocatory movement that is operable to apply pressure to force cement from the cement pot through the conduit and into the orifice when moved in a first direction and to terminate the application of pressure when moved in a second direction; powered means for effecting said plunger movements; a valve in the orifice having a valve head and a valve stem extending rearwardly away from the valve head, said valve having a first position wherein the head is seated against the seat to block the orifice and a second position wherein the head is away from the seat to permit the flow of cement through the orifice; means mounting the valve for movement from each of said positions to the other of said positions; a link pivotally mounted in the gun and connected to the valve stem whereby rearward movement of the link causes movement of the valve from the first position to the second position and forward movement of the link causes movement of the valve from the second position to the first position; a normally open switch mounted in the gun rearwardly of the link having a switch blade extending toward the link so that the switch is closed upon movement of the link rearwardly and is opened upon movement of the link forwardly; control means interconnecting the switch and the powered means actuable to effect movement of the plunger in said first direction upon closure of the switch and to effect movement of the plunger in said second direction upon opening of the switch; a trigger movably mounted in the gun; cooperating cam surfaces on the trigger and link; and spring means yieldably urging the cam surfaces against each other.

3. The mechanism according to claim 1 further comprising: heating means in the pot; heating means in the conduit; and heating means adjacent the barrel; whereby the cement is maintained molten in the pot and during its travel from the pot through the nozzle.

4. The mechanism according to claim 1 wherein said conduit is a flexible hollow tube extending from the cement pot to the gun, and further comprising: heating means in the pot; heating means in the tube; and heating means in the gun.

5. The mechanism according to claim 4 wherein the heating means in the tube comprises: a resistance wire extending longitudinally through the tube; and means for connecting the wire to a source of electrical power.

6. A cement extruding mechanism comprising: a source of cement; a gun; a nozzle in the gun; an orifice extending through the nozzle; a conduit interconnecting the source of cement and the orifice; pressure applying means operable when actuated to force cement from the source through the conduit into the orifice; a valve in the orifice having a first position wherein it blocks the orifice and a second position permitting the flow of cement through the orifice; means mounting the valve for movement from each of said positions to the other of said positions; a link movably mounted in the gun and connected to the valve so that movement of the link in a first direction causes movement of the valve from the first position to the second position and movement of the link in a second direction causes movement of the valve from the second position to the first position; a control member mounted in the gun having an actuating member so positioned as to be moved in response to movement of the link in each of said directions; and control means interconnecting the control member and the pressure applying means actuable in response to movement of the actuaing member by movement of the link in the first direction to operate the pressure applying means and actuable in response to movement of the actuating member by the movement of the link in the second direction to terminate the operation of the pressure applying means.

References Cited by the Examiner

UNITED STATES PATENTS

| | | | |
|---|---|---|---|
| 1,516,660 | 11/1924 | Beach | 239—415 |
| 1,524,283 | 1/1925 | Beach | 239—415 X |
| 2,149,932 | 3/1939 | Zippel | 239—527 |
| 2,577,572 | 12/1951 | Ferber | 222—383 X |
| 2,790,679 | 4/1957 | Martindale | 222—146 |
| 2,818,999 | 1/1958 | Miller | 222—323 |
| 2,979,234 | 4/1961 | Kamborian | 222—146 |
| 2,991,940 | 7/1961 | Dupler et al. | 239—128 X |
| 3,118,569 | 1/1964 | Liedberg et al. | 222—74 |

RAPHAEL M. LUPO, *Primary Examiner.*